United States Patent Office 3,531,589
Patented Sept. 29, 1970

3,531,589
HOLOGRAPHIC METHOD OF SELECTIVELY TRANSMITTING CHANGES IN A SCENE
Robert J. Collier, New Providence, and Keith S. Pennington, Basking Ridge, N.J., assignors to Bell Telephone Laboratories, Incorporated, Murray Hill and Berkeley Heights, N.J., a corporation of New York
Filed Dec. 29, 1966, Ser. No. 605,782
Int. Cl. H04n 5/30, 5/38
U.S. Cl. 178—7.2
3 Claims

ABSTRACT OF THE DISCLOSURE

A real-time transmission-bandwidth-reduction technique for television systems is disclosed in which a hologram is derived and developed in response to an original phase-object display, and subtraction of the unchanged portion of a subsequent phase-object display is achieved by shifting the phase of a reference beam used in making the hologram by $\pi$ radians and continuing to apply both a light wavefront from the display and the reference beam throughout wavefront reconstruction of an image of the changed display.

Each phase-object display is created from a conventional image by electron beam modification of a deformable oil film. The phase modulation of the output from the hologram is converted to intensity modulation by interference with a secondary phase-related reference beam having an effective $\pi/2$ radians phase shift relative to the average phase of the phase-modulated output light.

---

In our copending related application, Ser. No. 603,496, filed Dec. 21, 1966, which is assigned to the assignee hereof, we disclose a holographic method for reducing the transmission bandwidth of an information transmission system.

Our present invention is related to the foregoing in that it employs holographic techniques to delete optically the unchanged portions of a scene, or other multi-dimensional display, before scanning and encoding it for transmission. Such a method reduces the amount of information to be transmitted within a prescribed period of time, so that transmission bandwidth can be correspondingly reduced. Bandwidth in an information transmission system is the width of the frequency band employed to transmit the information.

Our invention resides in applying real-time, unfocused holographic image subtraction to reduce the transmission bandwidth in any transmission system in which information is provided as a display. Real-time operation is provided by fixing, or developing, a hologram derived from the original display before any wavefront emanating from a changed display is projected therethrough, so that a substantial succession of display changes can be processed without interruption for the making of a new hologram. Subtraction of the unchanged portion of the display is achieved by shifting the phase of a reference beam used in making the hologram by $\pi$ radians and continuing to apply both a light wavefront from the display and the reference beam throughout processing, including wavefront reconstruction, of an image of the changed display.

In an illustrative embodiment compatible with present day television and television-telephone systems, we make a series of intermediate two-dimensional records of a changing three-dimensional scene. In addition to facilitating compatibility, the intermediate record facilitates the making of the hologram because it is relatively small and stable, as compared to the original scene, and because it can be illuminated by laser light as intensely and as long as needed for satisfactory exposure of the holographic medium. This intermediate record is the display, hereinafter called the object from which the hologram is made and is either an intensity object that provides intensity variations in the manner one would normally expect to see them; or it may be a phase object that provides phase variations corresponding to the intensity variations that one would normally expect to see.

In the presently preferred method employed in the illustrative embodiment, rapid operation is facilitated by employing a phase object, since a semi-permanent record of this type can be made more rapidly than an intensity record of comparable durability when subjected to subsequent laser illumination. New developments in the art of recording intensity patterns could change our preference in this respect, since use of a rapidly recorded intensity object might make the overall system simpler.

Our present invention is more versatile than that of our above-identified copending patent application because our present invention can employ either an intensity object or a phase object whereas the other characteristically employs a phase object.

Another advantage of our present invention is that it employs a hologram made with an unfocused object wavefront, as contrasted to the image hologram made with a focused object wavefront according to the invention of our above-cited copending patent application.

Various other features and advantages of the present invention will become apparent from the following detailed description, taken together with the drawing, in which.

Figure 1:
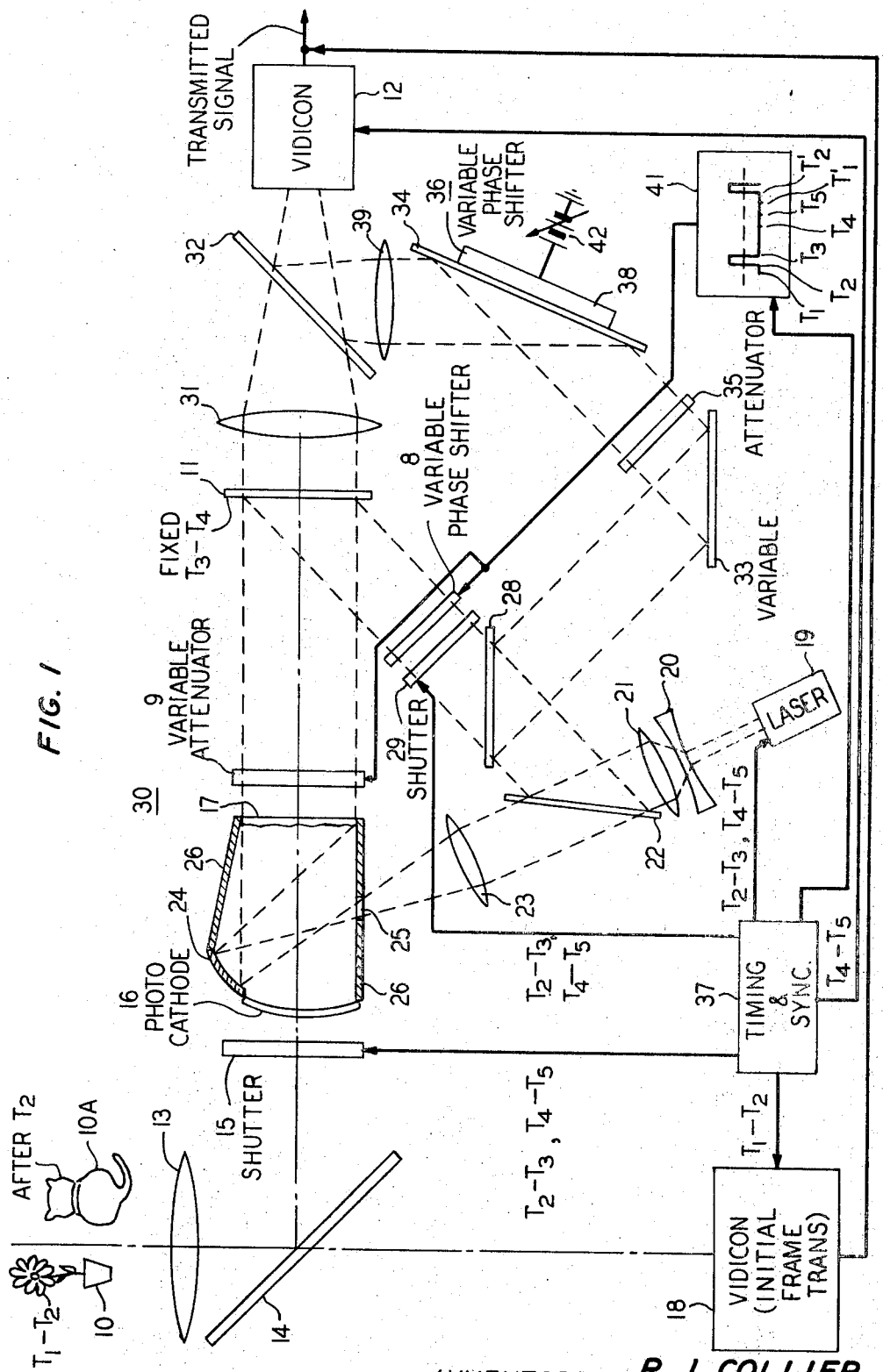
FIG. 1 shows, in pictorial and block diagrammatic form, an arrangement for practicing a preferred method according to our invention.

In FIG. 1 there is shown a transmitting station from which a changing scene is to be televised, that is transmitted to a remote receiving station (not shown).

The changing scene comprises a flowerpot 10, present from the time $T_1$ at least until the time $T_2$, and a cat 10A, which appears sometime after $T_2$.

The details of the remote receiving station are substantially conventional, except that the image information to be displayed there is stored in a message register so that newly received information about changes in intensity at various points in the image can be added to the appropriate locations in the register to arrive at the new intensities to be displayed at those points in the image. The display apparatus then repeatedly displays all the current data in the message register.

The transmitted signal is derived as follows. Ordinary light reflected from the flowerpot 10 is imaged by lens 13 upon a photocathode 16. Intermediately, it is reflected by partially transmissive reflector 14 and passed by shutter 15, which is open during the time period $T_1$–$T_2$. A pattern of energetic electrons responsive to the intensity image on photocathode 16 is emitted therefrom and travels to the phase object 17, which is illustratively a deformable oil film of negligible electrical conductivity disposed on a transparent conductive electrode, such a film being an Eidophor® oil film like that employed in our above-cited copending application. The phase object 17 responds to the pattern of electrons by acquiring a corresponding two-dimensional variation in its capability to retard or shift the phase of a coherent light wavefront passing through it. Until charge is removed or leaked from the phase object 17, it will tend to retain its acquired form when subjected to subsequent laser illumination.

Also during the time period $T_1$–$T_2$, the portion of light from flowerpot 10 that is passed by reflector 14 is supplied to the input optics of vidicon 18, from which it is transmitted to the remote station, stored in a message register and displayed. The full scene is transmitted at this point; and the benefit of bandwidth reduction is not yet apparent, unless, optionally, such full scenes or frames are transmitted at a slower rate than would be permissible in a conventional system.

At time $T_2$, the shutter 15 is closed; and vidicon 18 is turned off. During the time period $T_2-T_3$, the phase object 17 is illuminated with coherent light from laser 19. This light passes through lens 20 and 21, which form a broad beam, through a beam splitter 22 and a lens 23, which enables this portion of the laser light to pass through a relatively small aperture 25 in the side walls 26 of the image intensifier 20. The light is illustratively reflected from a focusing reflector 24, which enables the light to illuminate all of phase object 17 from a direction as near the axis as possible.

The phase-modulated light wavefront emanating from phase object 17 will hereinafter be termed the object wavefront. It passes through variable attenuator 9, which has a minimum attenuation during the period $T_2-T_3$ and exposes the holographic medium 11, which is illustratively a photographic medium that is as thin as possible. The exposure occurs under conditions of interference of the object wavefront with a reference beam, which is the portion of the laser light reflected by beam splitter 22, passed through beam splitter 28, shutter 29 and variable phase shifter 8. Phase shifter 8 illustratively provides minimum phase shift during the time period $T_2-T_3$.

At time $T_3$, the laser 19 is turned off; and the shutter 29 is closed. During the time period $T_3-T_4$, the holographic medium is developed. Preferably, the medium 11 is one of the new fast-developing films; and the period $T_3-T_4$ is as brief as possible.

During the ensuing time period $T_4-T_5$, the shutter 15 is again opened. A new phase object is formed which is responsive to the appearance of cat 10A. Concurrently, coherent light is projected through the changing phase object 17 from laser 19. This new object wavefront is attenuated by variable attenuator 9 by an amount to be explained hereinafter and illuminates the hologram plane along with a reference beam from laser 19 that has experienced an additional $\pi$ radians of phase shift in phase shifter 8, as compared to its phase shift during the period $T_2-T_3$.

The attenuation of the attenuator 9 is adjusted to the value that provides complete destructive interference between those portions of the undiffracted new object wavefront that have remained unchanged and the reconstruction of the original wavefront by the phase shifted reference beam. The result will then be that the net transmission through lens 31 and beam splitter 32 to vidicon 12 will be the phase differences between the new and original scene. It is noted that the component designated as the reconstruction of the original wavefront is the diffracted portion of the reference beam. It propagates collinearly with the undiffracted portion of the new object wavefront.

The adjustment of attenuator 9 can be made by visual observation of the destructive interference effect, for example, by splitting off a portion of the light directed into vidicon 12 and viewing it directly.

The portions of the reconstructed wavefront still bearing modulation between hologram 11 and beam splitter 32 have phase modulation that is directly related to the intensity differences between the original and changed scene, that is, the difference in intensity at pertinent points as produced by the cat 10A.

This phase modulation is reconverted to intensity modulation in order to be scanned and transmitted by the vidicon 12.

The conversion is accomplished by interference with a secondary phase-related reference beam having an effective $\pi/2$ radians phase shift relative to the average phase of the light transmitted through beam splitter 32. The secondary reference beam is reflected from beam splitters 22 and 28, reflector 33, variable phase shifter 36 and beam splitter 32. It is attenuated by attenuator 35 adjusted to give good contrast.

The adjustment of variable phase shifter 36 can be made separately from that of attenuator 9 because no meaningful intensity image can be observed at all until phase shifter 36 is properly adjusted, whereas proper adjustment of attenuator 9 achieves cancellation of unchanged portions of the scene.

The foregoing wavefront reconstruction process, involving attenuated object wavefront and phase-shifted reference beam is continued, or is repeated, for a series of scene changes until, illustratively at time $T_5$, no substantial bandwidth reduction is obtained. Then the entire process is repeated, including the transmission of an entire new frame by vidicon 18.

In practice, an arbitrary time might be set for starting to repeat the entire sequence of steps. This time might dependent up the durability of the object, e.g., object 17 or the durability of the hologram itself, as well as depending upon the probability of net bandwidth reduction.

After initial adjustment of the system, the periodic variations of phase shifter 8 and attenuator 9 can be provided by a set waveform from a voltage generator 41 of conventional components. The generator 41 is synchronized with the shutters, vidicons and laser 19 by timing and sychronization circuit 37, which also includes conventional components that generate appropriate mechanical or electrical triggering signals at the appropriate times.

The variable attenuator 9 may be a Pockels electroptic cell disposed between crossed polarizers, whereas attenuator 35 may be two polarizers rotatable mechanically relative to one another. The variable phase shifter 36 includes a reflector 34 mounted upon a conventional piezoelectric crystal 38, which drives reflector 34 in response to an adjustable direct-current voltage source 42, as shown.

Figure 2:
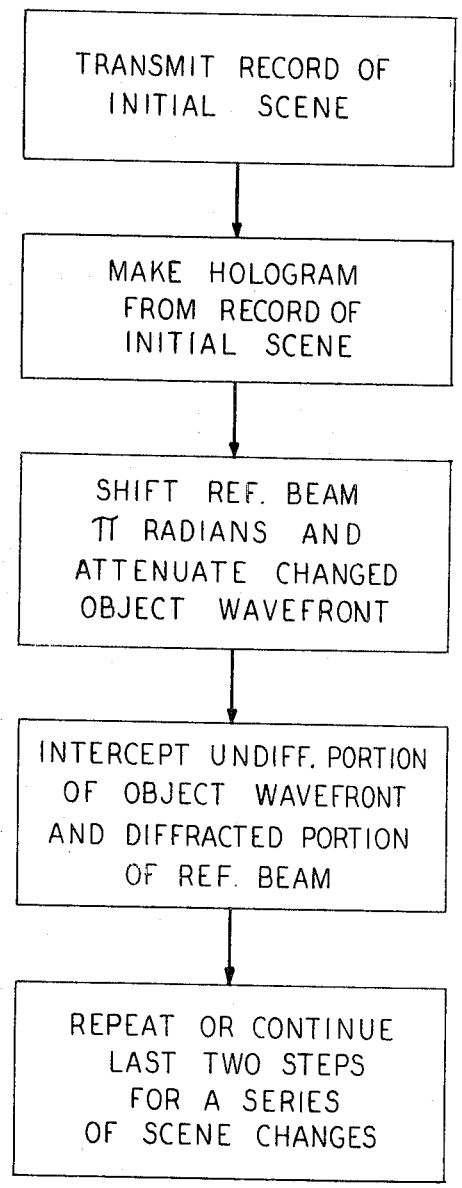
FIG. 2 shows, in flow diagram form, the basic steps of the preferred method.

The steps of the method of our present invention are summarized in the diagram of FIG. 2 and have already been explained in more detail in the foregoing description. These steps comprehend several possible modifications of the specifically described methods and apparatus. Such modifications include use of electrically controllable thermoplastic or photochromic materials as an intensity object substituted for the phase object 17 and the use of thermoplastic or photochromic type materials for the holographic medium 11, regardless of the type of object employed.

Other modifications include the use of other types of intensity objects in the place of the phase object, as explained in the summary of the invention. In all instances of use of an intensity object, the secondary reference beam can be eliminated.

What is claimed is:

1. A method of selectively transmitting the differences between an original and an altered scene, comprising the steps of forming with a first object wavefront and with a first interfering reference beam a fixed hologram from a record of the original scene, illuminating said hologram with a second attenuated object wavefront emanating from a record partially changed with respect to the previous record and with a second reference beam shifted $\pi$ radians in phase relative to said first reference beam at said hologram, transmitting a signal responsive to a light wavefront formed by the interference of the undiffracted portion of the second object wavefront and a diffracted portion of said second reference beam that is propagating collinearly with said undiffracted portion of said second object wavefront, said second object wavefront having an attenuation providing cancelling interference for unchanged portions of the record, and repeating the illuminating and transmitting steps with said fixed hologram for at least one succeeding change in the record.

2. A method according to claim 1 in which the forming step includes exposing a photographic film to the first object wavefront and the first interfering reference beam and then developing the film before the second object wavefront and second reference beam are projected upon said film.

3. A method according to claim 1 in which the forming step includes making a phase object record of the original scene, said phase object record providing phase modulation of a coherent light wavefront, which phase modulation spatially corresponds to intensity variations in light scattered from the scene.

References Cited

UNITED STATES PATENTS

| | | |
|---|---|---|
| 2,202,605 | 5/1940 | Schroter |
| 2,321,611 | 6/1943 | Moynihan |
| 2,951,899 | 9/1960 | Day |
| 3,423,526 | 1/1969 | Law |

OTHER REFERENCES

L. H. Tanner: Some Applications of Holography in Fluid Mechanics, February 1966, vol. 43, No. 2, pp. 81–83.

Holographic Vibration Analysis Promising for Non-Destructive Ultrasonic Testing, Laser Focus, September 1966, pp. 31–32.

L. O. Heflinger, Wuerker and Brooks: Holographic Interferometry, Jour. of Applied Physics, vol. 37, No. 2, February 1966.

ROBERT L. GRIFFIN, Primary Examiner

J. A. ORSINO, JR., Assistant Examiner

U.S. Cl. X.R.

350—3.5